United States Patent [19]

Jurgena

[11] Patent Number: 5,094,300
[45] Date of Patent: Mar. 10, 1992

[54] ATTACHMENT FOR GUIDANCE OF PULL-TYPE IMPLEMENTS

[75] Inventor: Larry F. Jurgena, Hampton, Iowa

[73] Assignee: Sukup Manufacturing Company, Sheffield, Iowa

[21] Appl. No.: 610,836

[22] Filed: Nov. 7, 1990

[51] Int. Cl.$^5$ .......................................... A01B 69/00
[52] U.S. Cl. ........................................ 172/5; 172/26; 172/248; 172/191; 104/244.1
[58] Field of Search ................ 172/5, 6, 26, 677, 439, 172/443, 446, 447, 324, 325, 248, 272, 180, 191; 171/9; 104/244.1; 180/131

[56] References Cited

U.S. PATENT DOCUMENTS

| | | | |
|---|---|---|---|
| 3,378,279 | 4/1968 | Jacobs | 172/677 X |
| 4,180,133 | 12/1979 | Collogan et al. | 172/324 X |
| 4,343,484 | 8/1982 | Van Antwerp | 172/272 |
| 4,607,716 | 8/1986 | Beck | 172/6 X |
| 4,616,712 | 10/1986 | Jorgeson | 172/6 |
| 4,640,365 | 2/1987 | Schmidt | 172/26 |
| 4,677,922 | 7/1987 | Shrull et al. | 172/677 X |
| 4,858,698 | 8/1989 | Williamson et al. | 172/677 X |
| 4,930,581 | 6/1990 | Fleischer et al. | 172/6 |

OTHER PUBLICATIONS

"Autoguide Guidance System", Sales Brochure by Sukup Mfg., Dec. 1989.
"Adapter Hitch", Article in Farm Journal by Sukup Mfg., Mar. 1990, p. 24.
"Guidance Systems Go To Work", Article in Farm Journal, Mar. 1990, pp. 38–39.
Buffalo Farm Equipment advertising brochure entitled "The Guidance System", Fleischer Manufacturing, Inc.
Buffalo Farm Equipment advertisement entitled "Scout the Ultimate Guidance System for Your Cultivator", Fleischer Manufacturing, Inc.
Navigator Row Crop Guidance System Operator's Manual and Parts Guide, H R Manufacturing Company.
Navigator Row Crop Guidance System advertising brochure entitled "#1 in Row Crop Guidance", H R Manufacturing Company.
Orthman Manufacturing, Inc. advertising brochure entitled "Phase II Tracker Automatic Guidance Control System".
Sunco Marketing advertising brochure entitled "Acura Track Guidance Control".

Primary Examiner—Randolph A. Reese
Assistant Examiner—Jeffrey L. Thompson
Attorney, Agent, or Firm—Leydig, Voit & Mayer

[57] ABSTRACT

An attachment accessory for an angularly adjustable agricultural implement guidance system that allows guidance of a pull-type implement thereby. A plurality of rotatable coulters which engage the ground are attached to a rigid frame which is connected to the guidance mechanism and tows a pull-type implement.

20 Claims, 5 Drawing Sheets

ATTACHMENT FOR GUIDANCE OF PULL-TYPE IMPLEMENTS

BACKGROUND OF THE INVENTION

This invention relates to a guidance system for agricultural equipment and more particularly to a guidance attachment for use with pull-type implements.

One problem confronting farmers in the operation of farm equipment is the lateral deviation of a tractor or an agricultural implement relative to a desired path when the tractor is pulling an agricultural implement through a field. Agricultural implement guidance systems are well known which utilize sensing devices that sense the position of crop rows, furrows or ridges as a reference to determine the desired path. The sensing devices typically provide an electronic output control signal corresponding to the instantaneous lateral position of the implement relative to the reference.

The output control signal serves as an input to an appropriate indicator or power guidance mechanism for assisting in or effecting the lateral positioning of the implement to an optimum operational position relative to the reference. For example, the output may drive a visible indicator observed by the operator of the implement or a towing tractor for appropriate corrective manual guidance to seek the optimum positioning of the implement. Alternatively, the output may be used as an input to an automatic power guidance mechanism for effecting automatic lateral adjustment of the implement relative to the sensed reference. One type of guidance mechanism is shown in U.S. patent application Ser. No. 07/424,701 which was filed on Oct. 20, 1989 and issued as U.S. Pat. No. 5,029,650. However, there are many types of guidance mechanisms which are well known in the art.

One known automatic power guidance mechanism is a quick attaching hitch coupler which has means for adjusting the implement attachment points to effect automatic lateral adjustment of the implement. This automatic power guidance mechanism is connected to the three point hitch of the agricultural tractor or vehicle. An implement is then mounted directly to the implement attachment points on the guidance mechanism. Implements which so utilize the three point hitch are supported completely or partially by the three point hitch. The location of the implement attachment points on the guidance mechanism correspond to the attachment points of the three point hitch of the agricultural tractor. When the implement is attached by the three attachment points, the implement is positioned in a predetermined vertical and lateral angular orientation, relative to the tractor, corresponding to the orientation of the attachment points. The guidance mechanism can accomplish lateral adjustment of the implement by changing the angular position of an outer frame which carries the implement, relative to an inner frame which is affixed to the three point hitch of the tractor. This angular adjustment steers the agricultural implement. Ground engaging tracking elements, such as fixed coulters or wheels on the implement, cause the necessary lateral adjustment as the implement moves forward at a slight angle to the direction of movement of the tractor. The necessary relative lateral movement is permitted by swinging ("sway") movement of the tractor hitch system.

However, many agricultural implements are attached to the tractor at a single free-pivoting hitch point. They are not attached in a fixed angular position as with an implement mounted on a three point hitch of an agricultural tractor. These implements are commonly referred to as "pull-type" implements because the tractor merely pulls the implement through the field.

It is an object of the present invention to provide an accessory attachment device which will allow pull-type implements to be guided with a variable angle guidance mechanism.

It is a related object to allow known variable-angle guidance systems to be used with pull-type as well as mounted or semi-mounted implements.

Another object of this invention is to provide a ground engaging guidance device for use with pull-type implements.

Yet another object of this invention is to provide an attachment device which is capable of being used on several different implements.

Other objects and advantages of the invention will become apparent upon reading the following detailed description and appended claims, and upon reference to the accompanying drawings.

SUMMARY OF THE INVENTION

The aforementioned requirements and objects are satisfied through the tracking towbar accessory of this invention. The towbar accessory includes a frame assembly, a tow attachment assembly, a ground engaging tracking assembly and three point hitch attachment means. The frame assembly is a plurality of horizontal and vertical members which form a rigid structure. The frame assembly is connected to the guidance mechanism of the tractor by a three point hitch attachment means comprised of pin and clevis brackets.

The tow attachment hitch assembly includes two converging rigid extensions which are connected to the frame assembly. The two rigid converging extensions converge toward a rectangular plate with a hole to form a single pin attachment point. The tow accessory assembly allows a pull-type implement to be attached to the towbar accessory. The ground engaging tracking assembly comprises two or more parallel rotatable coulters which are rigidly affixed to the frame assembly.

When the subject tow-bar accessory is mounted on a tractor equipped with transverse hitch attachments and an angularly adjustable guidance system which adjusts the guidance angle of that hitch, the angular adjustment is directly communicated to the rigidly affixed transverse frame assembly of the tow bar accessory. The angular adjustment thereby is also directly communicated to the ground engaging steering assembly which is rigidly affixed to the frame assembly. Therefore, the direction that the tow-bar accessory tracks as the tractor advances is adjusted correspondingly to the angular adjustment of the guidance system. As the tractor pulls the assembly forward, the frame and hitch tend to move in their newly adjusted direction which results in lateral adjustment of the tow-bar accessory relative to the tractor. This lateral adjustment results in corresponding lateral adjustment of the attached trailing pull-type implement whereby the path of that pull-type implement will conform closely to a desired path being sensed by the guidance system.

BRIEF DESCRIPTION OF THE DRAWINGS

In FIG. 7 the tractor, tow bar accessory and the implement are aligned laterally with respect to the planter marker furrow. In FIG. 8 the tractor has deviated from proper alignment with the marker furrow and the tow bar accessory is turned by the guidance mechanism to adjust the alignment of the tow bar accessory with respect to the tractor so that the implement is aligned with the marker furrow.

In FIGS. 9-13, the tractor, towbar accessory and implement encounter a bend or turn in the marker furrow. In FIG. 9 the tractor path has deviated from the marker furrow segment beyond a bend but the implement is aligned with the preceding marker furrow segment. In FIG. 10 the tractor operator has partially corrected the orientation of the tractor to correspond with the bend in the marker furrow and the guidance mechanism has turned the tow bar to adjust the alignment of the tow bar accessory. In FIG. 11, the tractor has deviated from the marker furrow, the guidance mechanism has turned the tow bar to adjust the alignment of the tow bar, and the angle between the tow bar and the implement has changed. In FIG. 12, the tow bar has adjusted the alignment of the implement and the implement is aligned with the furrow. In FIG. 13, the tractor is aligned with the marker furrow and the guidance mechanism is in the neutral position but the planter is slightly misaligned with respect to the marker furrow.

It should be understood that the drawings are not necessarily to scale and that an embodiment is sometimes illustrated in part by schematic and fragmentary views. It should be understood, of course, that the invention is not necessarily limited to the particular embodiments illustrated herein.

DESCRIPTION OF THE PREFERRED EMBODIMENTS

Referring to FIGS. 1 and 7-10, the tow bar accessory 10 is attached to a guidance mechanism 12 which is attached to a conventional three point hitch of an agricultural tractor. The hitch 14 of a pull-type implement (not shown) is attached to the tow bar accessory 10. The tow bar accessory or attachment device 10 includes a frame assembly 16, an implement hitch assembly 18, a ground engaging assembly 20 and a three point hitch attachment means 22.

The frame assembly 16 includes two vertical frame members 30 and 32, an upper horizontal frame member 34 and two lower horizontal frame members 36 and 38. The vertical frame members 30 and 32 are each welded or otherwise affixed at opposite ends to the upper horizontal frame member 34. The first lower horizontal frame member 36 is welded to the lower ends of vertical frame members 30 and 32 to form a rectangular shaped frame.

The second lower horizontal frame member 38 is fixedly attached to the first horizontal frame member 36 by two base extension bars 40 and 42. Base extension bars 40 and 42 extend perpendicularly from the rear face of the first lower horizontal frame member 36 and are connected to the front face of the second lower horizontal frame member 38.

Extending from the rear face of the vertical frame members 30 and 32 at an angle of approximately 45 degrees down from horizontal are support braces 44 and 46. The lower ends of the support braces 44 and 46 are connected to the top face of the second lower horizontal frame member 38. The support braces 44 and 46 together with base extension bars 40 and 42 and second lower horizontal frame member 38 add structural rigidity to the attachment device.

Squeeze plates 50 and 52 are affixed to the center of the first lower horizontal frame member 36, as by having one edge welded to the frame member 36. Each squeeze plate 50 and 52 has holes 54 and 56 respectively which are aligned to receive a clamping bolt 57. Squeeze plates 50 and 52 are spaced apart so that a mounting bracket 58 of a sensing means 60 may be placed and changed therebetween. The mounting bracket 58 is held securely by tightening the clamping bolt 57 and mating nut (not shown).

Figure 1:
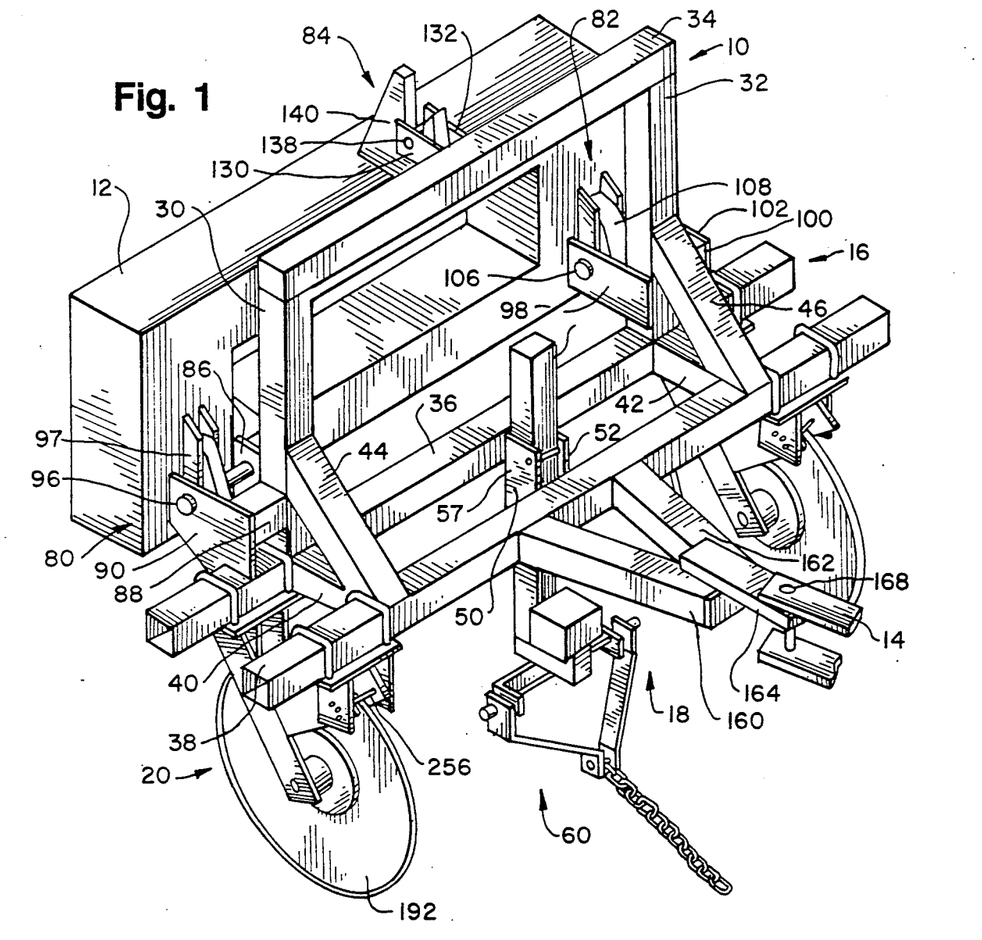
FIG. 1 is a perspective view of the accessory tow bar accessory, attached to a guidance mechanism and fragmentary view of a pull-type implement.
Figure 6:
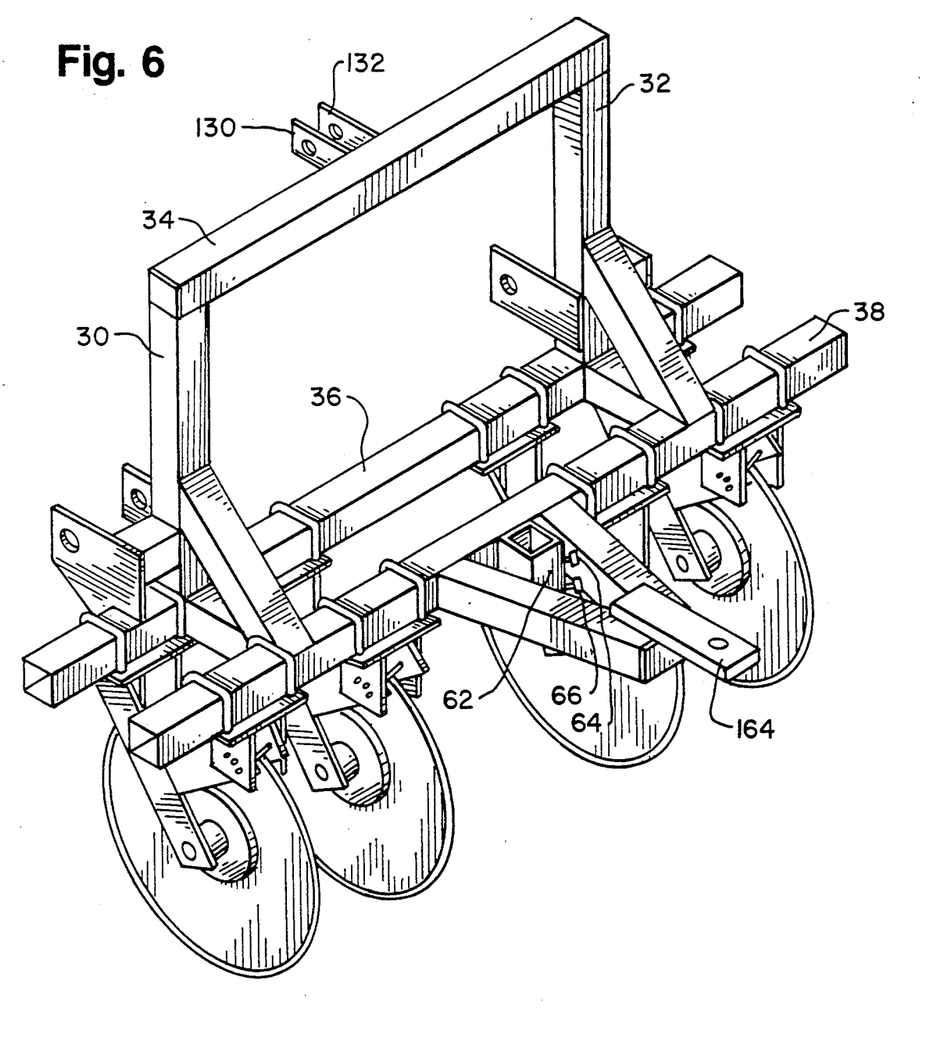
FIG. 6 is a perspective view of an alternative embodiment of the tow bar accessory with four coulters.

An alternative embodiment for attaching a sensing means 24 is shown in FIG. 6. A hollow square sleeve 62 is welded or otherwise affixed to the center of the front face of the horizontal frame member 38. The sleeve 62 is capable of accepting the mounting bracket 58 of sensing means 60. Specifically, the mounting bracket 58 is inserted into sleeve 62 and positioned to the height desired by the operator. The operator then tightens the two set screws 64 and 66 to hold the mounting bracket 58 in the desired position. As shown in FIGS. 1 and 6, the sensing means 60 can be mounted either on horizontal frame member 36 or on horizontal frame member 38.

Figure 3:
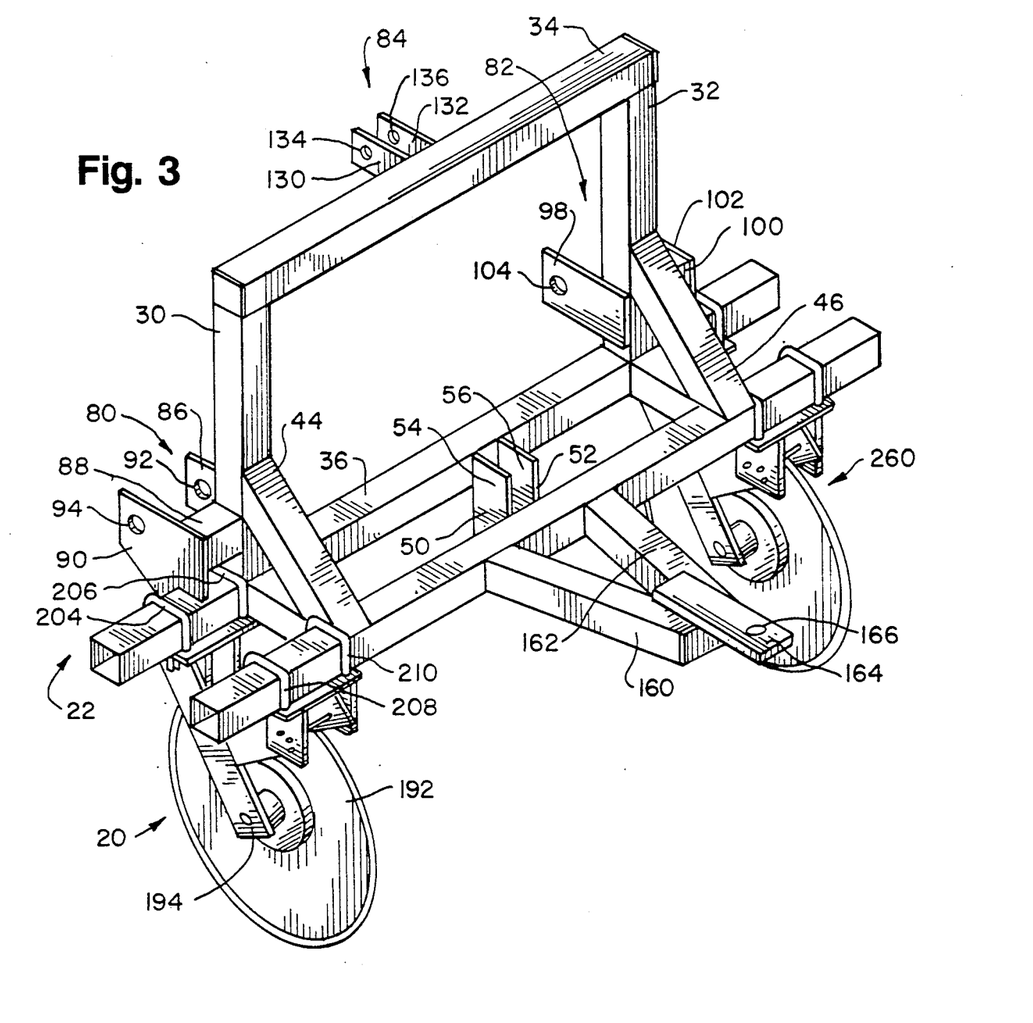
FIG. 3 is a perspective view of the tow bar accessory.

Referring to FIG. 3, the three point hitch attachment means 22 includes a first lower attachment point 80, a second lower attachment point 82 and an upper attachment point 84. The first lower attachment point 80 includes a bracket plate 86 which is welded to the bottom inside face of vertical frame member 30. A square support bar 88 is welded or otherwise affixed perpendicularly to the bottom outside face of vertical frame member 30. A bracket plate 90 is welded to other end of support bar 88 so that bracket plates 86 and 90 are substantially parallel.

The bracket plates 86 and 90 have holes 92 and 94 respectively. The bracket plates 86 and 90 are positioned so that the holes 92 and 94 are aligned and receive a pin 96 for mounting to the three point hitch attachment point 97 on the guidance mechanism 12. (See FIG. 1).

The second lower attachment point 82 has the same construction as the first lower attachment point 80. It includes a bracket plate 98 and a square support bar 100 correspondingly welded or otherwise affixed to the vertical frame member 32. A bracket plate 102 with a hole 104 is welded to the other end of support bar 100 so that bracket plates 98 and 102 are substantially parallel. The bracket plates 98 and 102 are positioned so that the holes are aligned and receive a pin 106 for mounting to the three point hitch attachment point 108 on the guidance mechanism 12. (See FIG. 1).

As shown in FIG. 3, the upper attachment point 84 includes spaced, parallel bracket plates 130 and 132 which are welded or otherwise affixed to the upper horizontal frame member 34. As shown in FIG. 1, the bracket plates 130 and 132 are positioned so that the holes 134 and 136 therein are aligned and receive a pin 138 for mounting to the three-point hitch attachment point 140 on the guidance mechanism 12.

The implement hitch assembly 18 is rigidly affixed to the second lower horizontal frame member 38. It includes two converging bar extensions 160 and 162 protruding from the rear face of the second lower horizontal frame member 38 and welded to frame member 38. The two bars 160 and 162 converge toward a rectangular hitch plate 164 which is affixed to these bars. The distal end of plate 164 has a hole or aperture 166 which accepts a draw pin 168 for free pivotal attachment of the hitch 14 of a pull type implement. It will be appreciated that the implement may be any pull-type agricultural implement where close conformance to a desired path is desirable, such as planters and other row crop husbandry machines such as cultivators, and the implement is attached by using a freely pivotal hitch such as single hitch pin 168. Consequently, the implement may freely pivot in the horizontal plane, as about the pin 168, and the pulling force of the tractor is focused at the pin.

Figure 2:
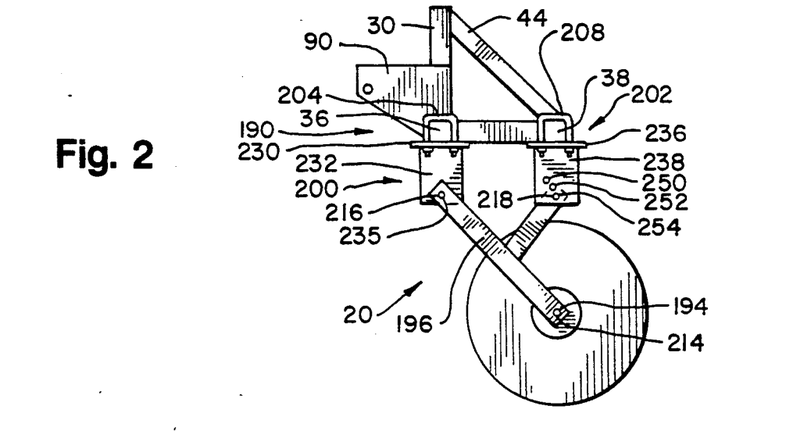
FIG. 2 is a partial side view of the tow bar accessory.
Figure 4:
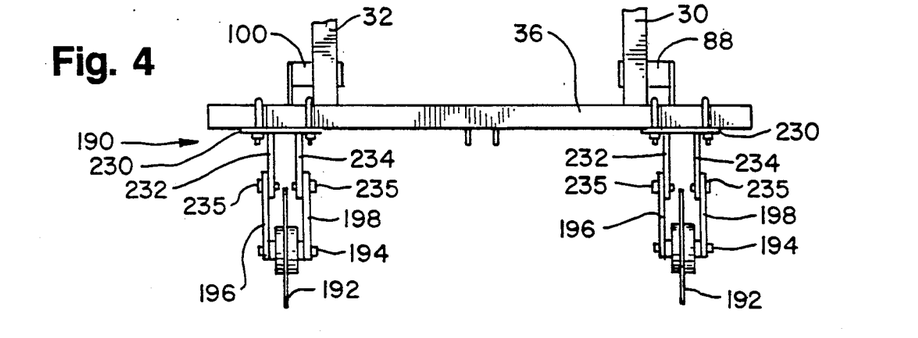
FIG. 4 is a partial front view of the tow bar accessory.
Figure 5:
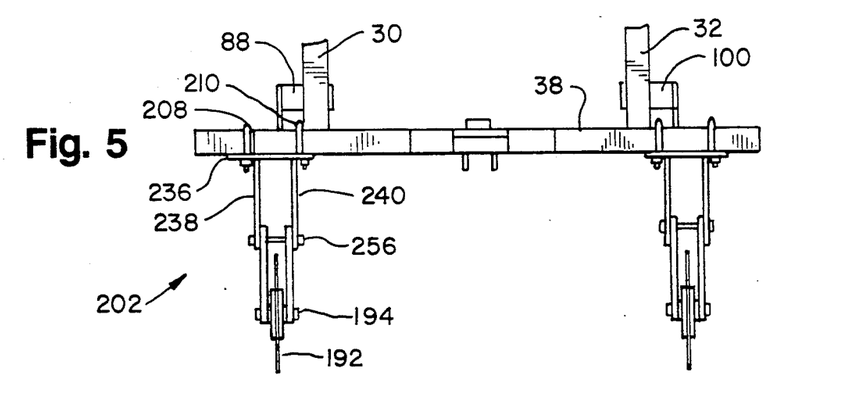
FIG. 5 is a partial rear view of the tow bar accessory.

Referring to FIGS. 2 and 4, the ground engaging tracking assembly 20 is rigidly affixed to the lower horizontal frame members 36 and 38 by a mounting assembly 190. The ground engaging tracking assembly 20 includes a circular planar coulter 192 which is rotatable about an axle assembly 194. The coulter 192 is positioned such that the lower portion of the coulter penetrates and runs in the soil between the crop rows.

Each mounting assembly 190 rotatably attaches the respective coulter 192 in fixed directional (or "angular") relation to the frame assembly 16. Each illustrated mounting assembly 190 includes two spaced parallel Y-shaped members 196 and 198, two mounting brackets 200 and 202, and four U-shaped attachment bolts 204, 206, 208 and 210. The Y-shaped members 196 and 198 have three holes or apertures 214, 216 and 218 near the ends of the respective legs. The ends of the respective axle assembly 194 are inserted into the apertures 214 and affixed to the members 196 and 198. The upper ends of the Y-shaped members 196 and 198 are secured to the mounting brackets 200 and 202.

Each mounting bracket 200, 202 has a horizontal plate 230, 236 and two vertical plates 232, 234, 238 and 240 which are attached to the respective horizontal plate. Each horizontal plate 230 has four holes (not shown) near the perimeter of the plate for accepting two of the U-shaped attachment bolts. The first legs of the respective Y-shaped members 196 and 198 are attached to the vertical plates 232, 234, 236, 238 by bolts 235 inserted into apertures 216 and the apertures in the vertical plates. The bolts 235 are fastened with nuts or other fasteners.

Each mounting bracket 202 corresponds to a mounting bracket 200 except for a series of holes which are used to change the position of the respective coulter 192. Specifically, each pair of vertical plates 238 and 240 has a series of apertures or holes for adjusting the position of the Y-shaped members. Specifically, the apertures 250, 252 and 254 are disposed along an arc length which corresponds with the arc created by pivoting the respective Y-shaped members on bolts 235. The operator positions the Y-shaped members 196 and 198 between the vertical plates 238 and 240 to achieve the desired position of the coulter. The operator then inserts a bolt 256 into the apertures 250, 252, 254 (FIGS. 1 and 2) which corresponds to the aperture 218 of the Y-shaped member. For example, as shown in FIG. 2, the bolt is inserted into aperture 218 of the Y-shaped member and aperture 254 of the vertical plate 238. The bolt is held in position by a nut or other fastener.

By adjusting the position of the Y-shaped members and correspondingly the coulters, the operator is able to adjust the depth that the coulter 192 engages the soil. The operator may need to adjust the depth of the coulter due to soil or crop residue conditions so that the coulter properly penetrates the soil. As will be discussed later, the penetration of the coulter in the soil is important in providing the steering or tracking function of the attachment device.

Since the coulters travel between the rows of crops, the operator may need to adjust the position of the coulters in order to use the attachment device in fields which have different spacing between the crop rows. As shown in FIG. 3, the mounting brackets 200 and 202 and U-shaped bolts 204, 206, 208, and 210 allow the operator to make such lateral adjustments of the positions of the coulters on the frame assembly. The U-shaped bolts straddle the frame members and are inserted into the holes or apertures in the horizontal mounting plates. The U-shaped bolts are threaded at both ends and nuts or other fasteners are utilized to hold the bolts and the mounting bracket in a selected fixed position with respect to the frame member 36. The operator can laterally adjust the position of the coulters with respect to the frame assembly by loosening the fasteners on the U-shaped bolts and moving the ground engaging tracking assembly to the desired position. The operator then tightens the fasteners on the U-shaped bolts to hold the ground engaging tracking assembly in the desired position.

As shown in FIG. 3, the attachment device can have two ground engaging tracking assemblies 20 and which have substantially identical construction and components. In addition, as shown in FIG. 6, the attachment device can have four ground engaging tracking assemblies. Each ground engaging assembly is laterally adjustable on the frame assembly to accommodate row crops of different widths.

The guidance mechanism 12 includes hitch points 97 and 108 which define a transverse hitch line or plane (with hitch point 140), which line or plane is disposed generally perpendicular to the longitudinal axis of the towing vehicle on which the guide mechanism is mounted. The guidance mechanism also includes means for moving these hitch points 97 and 108 fore-and-aft relative to the vehicle and relative to one another for controlled variation of the horizontal angle at which this hitch line or plane is disposed relative to that longitudinal axis. This axis generally also corresponds to the direction of movement of the vehicle in normal operations. Sensing and drive means are provided, including the sensor mechanism 60, for varying this angular relationship of the hitch to the vehicle in response to the sensed deviation of the tow-bar accessory 10 or of an implement towed thereby from a desired path of movement, e.g., relative to a crop row, ridge, guide furrow, or other reference. Necessary lateral movement between the implement and the vehicle is permitted by the hitch system, as by the pivotal or "sway" movement available in a three point hitch, for aligning the implement with the desired path despite minor deviations of the vehicle from its optimum lateral position relative to that path.

A variety of such guidance mechanisms are known in this art, including several which are integrated into so-called quick hitches. In those systems, the relative angle is varied, as appropriate, to guide a mounted or semi-mounted implement for micro shifting laterally of the vehicle toward the desired implement path by the tracking action of the coulters or wheels on the implement.

As is also known in the art, such guidance systems use various sensing devices to determine the relative location of reference indicia and communicate this information to a power mechanism for effecting the angular adjustment of the hitch. One such sensing device is a chain mounted on a photo-electric position sensor as at 60 in FIG. 1. For example, the sensing device may send an electrical position signal to a control box. The control box sends a control signal to a hydraulically adjustable guidance mechanism 12. As previously noted, one type of guidance mechanism is shown in U.S. Pat. No. 5,029,650, and one sensing mechanism is disclosed in U.S. patent application of Larry F. Jurgena filed Nov. 2, 1990 and entitled Sensing Apparatus for a Guidance System, which are incorporated herein by reference.

A tracking tow-bar accessory as disclosed herein may be used in combination with any such units, including the so-called quick-hitch guidance systems. As illustrated herein, the mechanism 12 is embodied in a quick hitch assembly which is mounted on the conventional three-point hitch of a tractor.

Figure 7:
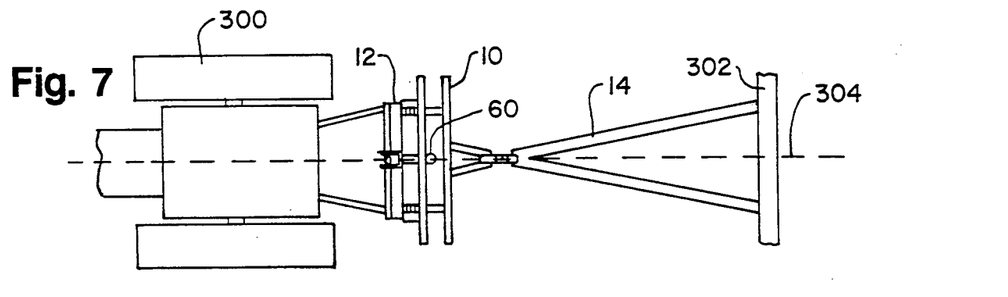
FIGS. 7-13 are top views of the tow bar accessory connected to a tractor and a trailing pull-type implement and illustrating in an exaggerated manner a mode of guidance of the implement relative to the tractor.
Figure 8:
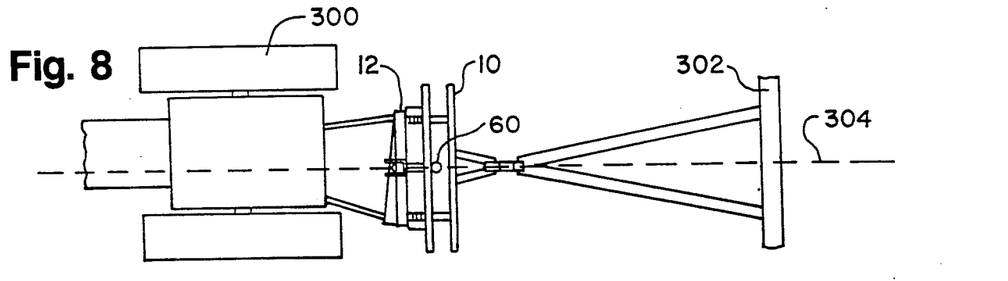

Referring to FIGS. 7 and 8, the tow bar accessory operates in the following manner. As shown in FIG. 7, the vehicle 300, the tow bar accessory 10 and the implement 302 are aligned laterally with the marker furrow 304. When the vehicle and tow bar accessory are in straight alignment and properly aligned with the marker furrow 304, the guidance mechanism 12 is in a neutral position, i.e., the guidance mechanism is not providing angular or lateral adjustment to the tow bar accessory relative to the vehicle. When the tractor and implement combination is in the alignment shown in FIG. 7, the coulters of the ground steering assemblies 20 should rotate directly between the crop rows thereby communicating this direction to the implement in tow.

As shown in FIG. 8, the center of the tractor has deviated from the marker furrow 304. The sensing mechanism 60 has detected that the implement is not properly aligned with the marker furrow. The sensing mechanism 60 sends an output signal to the control system which sends a control signal to the guidance mechanism 12. As shown in FIG. 8 when the guidance mechanism 12 receives the control signal, the guidance mechanism 12 makes an angular adjustment relative to the vehicle. Thus, the tow bar accessory is turned by the guidance mechanism 12 to adjust the alignment of the tow bar accessory 10 with respect to the tractor 300 so that the tow bar and the implement 302 are aligned with the marker furrow 304.

The tracking of a pull-type implement around curves and bends with the disclosed accessory tow-bar guidance system is complex and not fully understood. Some slight misalignment, as on the inside of corners or abrupt curves may occur. However, even in these circumstances, the accuracy of tracking the desired path seems to be improved over that obtained without the guided tow-bar accessory. The following description is believed to be at least partially explanatory.

Figure 9:
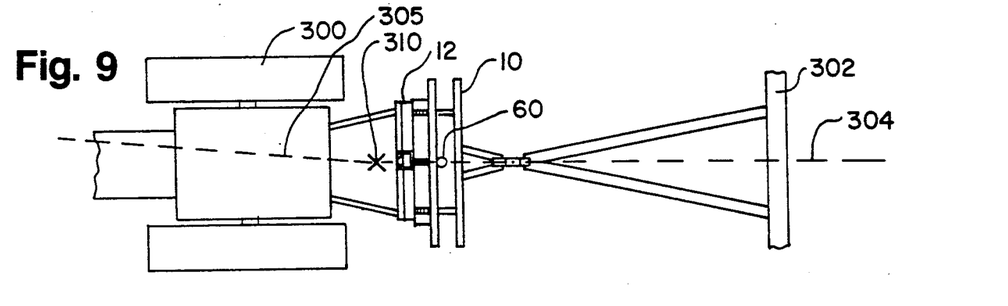

Referring to FIGS. 9–13, the tractor, tow bar accessory and implement combination may encounter a bend or turn 310 in the marker furrow 304. As shown in FIG. 9, the centerline of the tractor 300 has deviated from the marker furrow segment 305 beyond the bend 310. The tractor operator has not yet corrected the position of the tractor 300 after encountering the bend 310 in the marker furrow. However, the implement 302 is properly aligned with the marker furrow 304 because the implement has not yet encountered the bend 310 in the marker furrow. Also the guidance mechanism 12 is in a neutral position because the sensing mechanism 60 has not yet encountered the bend 310 in the marker furrow and therefore has not provided an output signal for adjustment of the guidance mechanism 12.

Figure 10:
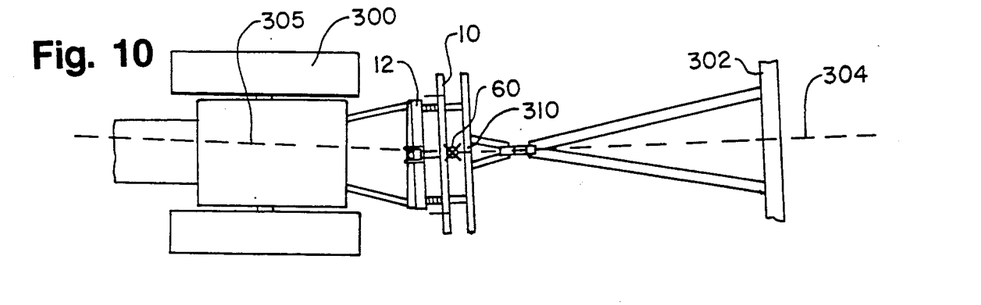

Referring to FIG. 10 the tractor operator has made a slight steering adjustment which has begun to move the tractor 300 to the right in order to follow the bend 310 in the marker furrow. The guidance mechanism 12 has made an angular adjustment in order to compensate for this lateral movement of the tractor relative to the furrow segment 304 at the sensing mechanism 60 prior to the bend 310. The implement 302 is still aligned with the marker furrow 304 and in straight alignment with the tow bar accessory 10.

Figure 11:
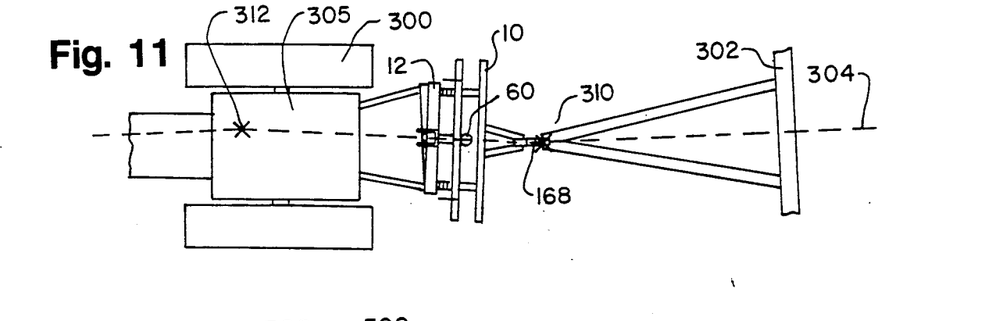

As shown in FIG. 11, the sensing mechanism 60 has passed through the bend 310 in the marker furrow. The tractor is left of the furrow segment 305 now being sensed and the sensing mechanism 60 has transmitted an output signal. The guidance mechanism 12 has adjusted the angle between the tractor 300 and the tow bar accessory 10 in order to maintain the proper alignment of the tow bar relative to the marker furrow segment 305. The tow bar accessory 10 is no longer in straight alignment with the implement 302 but rather an adjustment angle has occurred between the tow bar accessory 10 and the implement 302 at the pivot point 168. Accordingly, the implement 302 may track slightly inside of the bend in the furrow.

Figure 12:
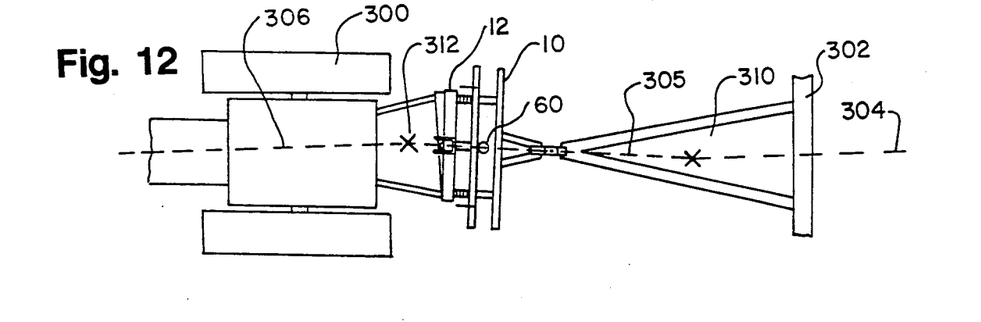

Referring to FIG. 12, the ground engaging coulters on the tow bar accessory 10 have performed the tracking function and adjusted the alignment of the implement with respect to the marker furrow 305. The guidance mechanism 12 has made a further angular adjustment because the vehicle operator has changed the position of the tractor 300 to the left of the line of furrow segment 305, to follow the bend 312 in the marker furrow to segment 306.

Figure 13:
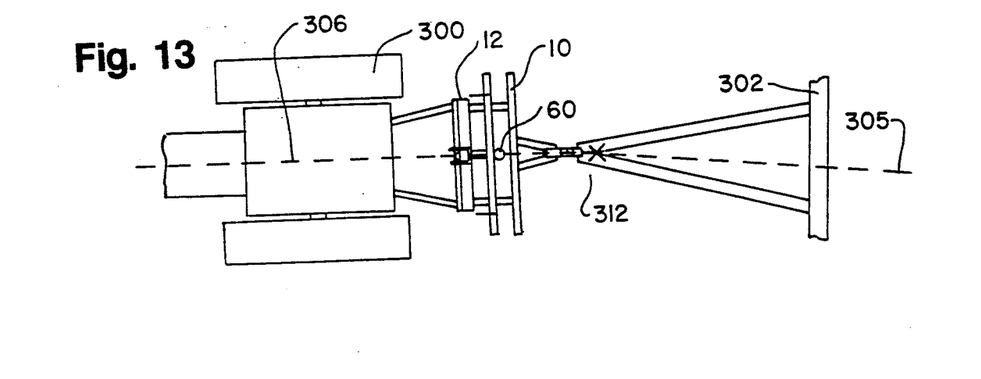

As shown in FIG. 13 the tractor 300 and the tow bar 10 are in straight alignment and are centered on the marker furrow segment 306. Consequently, the guidance mechanism 12 is in a neutral position since it is not necessary to make an angular adjustment to the tow bar accessory 10 relative to the tractor 300. The implement 302 is slightly off center with respect to the marker furrow 305 because the implement 302 is coming into alignment with the marker furrow 306.

It will be appreciated that an attachment accessory device allowing a pull type implement to utilize the convenience of a guidance system has been provided which meets the aforestated objects.

While specific embodiments of the invention have been shown and described, it will be understood, of course, that the invention is not limited thereto since modification may be made and other embodiments of the principles of this invention will occur to those skilled in the art to which this invention pertains. Therefore, it is contemplated by the appended claims to cover any such modifications and other embodiments as incorporate the features of this invention within the true spirit and scope of the following claims.

What is claimed is:

1. A tracking towbar accessory for lateral positioning control of a pull-type row-crop implement relative to a designated path by a vehicle having a hitch which is angularly adjustable relative to the longitudinal axis of the vehicle, said towbar assembly comprising a short frame, means to mount said frame in fixed relation to said angularly adjustable hitch, ground engaging tracking means in fixed predisposed angular position on said frame for effecting lateral movement of said frame relative to said vehicle in accordance with the angular disposition of said hitch and said frame as said vehicle advances, said towbar accessory being free of tillage and planting tools which perform any substantial tillage or planting function, and, a tow attachment means on said frame for pivotally engaging and towing a pull-type implement.

2. In combination, a tracking towbar accessory as in claim 1, and sensor means for providing an output corresponding to the lateral position of said frame relative to a predetermined path therefor, and means for controlling the angular position of said vehicle hitch relative to said vehicle in accordance with said output of said sensor means.

3. The invention as in claim 2 wherein said sensor means is mounted to said implement.

4. The invention as in claim 1 wherein said frame is affixed to a vehicle hitch which is laterally movable as well as angularly adjustable relative to said vehicle.

5. The invention as in claim 1 wherein said frame comprises two vertical frame members, an upper horizontal frame member, and a first lower horizontal frame member, said vertical frame members each connected at one end to said upper horizontal frame member and at the other end to said first lower horizontal frame member.

6. The invention as in claim 5 wherein said means to mount said frame comprises two attachment pins mounted on said first lower horizontal frame member and a third attachment pin mounted on the center of said upper horizontal frame member, said attachment pins arranged to engage the rearwardly projecting hooks of a conventional quick hitch mechanism.

7. The invention as in claim 1 wherein said ground engaging tracking means is rigidly affixed to said frame by an adjustable clamping assembly wherein said clamping assembly may be moved laterally along first and second lower horizontal frame members to align said ground engaging tracking means relative to the width of a given crop row.

8. The invention as in claim 1 wherein said tow attachment means comprises an elongated tongue having a hole at one end for accepting a pin for the attachment of a pull-type implement.

9. In combination with a towing vehicle having a transversely disposed hitch thereon which is angularly adjustable relative to the longitudinal axis of said vehicle, means for controllably adjusting the angle of said hitch, an implement for performing a predetermined crop husbandry operation along a predetermined path, the improvement comprising:

a tracking tow bar accessory comprising a short frame, means for mounting said frame in fixed relation to said angularly adjustable hitch, and ground engaging tracking members mounted in fixed predisposed angular position on said frame;

said towbar accessory being free of tillage and planting tools which perform any substantial tillage or planting function;

said implement being a pull-type implement;

means for pivotal attachment of said pull-type implement to said frame for towing of said implement; and said means for controllably adjusting the angle of said hitch including a sensor mounted on said accessory to provide a control input corresponding to the lateral position of said accessory relative to such desired path, whereby said tracking towbar accessory will move laterally relative to said vehicle and the lateral position of said pull-type implement will be adjusted thereby relative to the extended longitudinal axis of said vehicle in accordance with such control input as said vehicle pulls said tracking towbar accessory and said pull-type implement across a field.

10. The invention as in claim 9 wherein said ground engaging tracking members are disk coulters.

11. The invention as in claim 9 wherein said ground engaging tracking members are wheels.

12. The invention as in claim 9 wherein said hitch is a quick-hitch attachment affixed to a three-point hitch of said vehicle.

13. The invention as in claim 12 wherein said quick hitch attachment includes laterally spaced engagement elements engageable by said frame mounting means, and means for controllably varying the position of said engagement elements relative to the points of mounting of said quick hitch attachment to said three-point hitch to provide said angular adjustability of said transversely disposed hitch.

14. The invention as in claim 9 wherein said pull-type implement is a planter implement.

15. The invention as in claim 9 wherein said pull-type implement is a tillage implement.

16. In combination:

a towing vehicle having transversely disposed hitch means for towing an implement and which hitch means is angularly adjustable relative to the longitudinal axis of said towing vehicle;

first means for controllably changing the angle of said transversely disposed hitch means relative to said longitudinal axis;

a tracking towbar accessory comprising a short frame, means to mount said frame in a fixed relation to said hitch means, ground engaging tracking means in fixed predisposed angular position on said frame, a tow attachment on said frame, said towbar accessory being free of tillage and planting tools which perform any substantial tillage or planting function;

a pull-type implement pivotally joined to said tow attachment;

sensor means for providing an output corresponding to the lateral position of said implement relative to a predetermined path therefor; and means for providing a control input to said first means in accordance with said output of said sensor means;

whereby the lateral position of said implement will be adjusted relative to the extended longitudinal axis of said vehicle in accordance with the output of said sensor means as said towing vehicle pulls said towbar accessory and said implement along said predetermined path.

17. The invention as in claim 16 wherein said ground engaging tracking means comprises a coulter rotatable on a horizontal axis.

18. The invention as in claim 16 wherein said coulter is fixedly attached to said frame by an adjustable mounting assembly whereby said mounting assembly may be moved laterally along first and second lower horizontal frame members, said coulter also being adjustable vertically with respect to said frame.

19. The invention as in claim 16, wherein said hitch is a quick-hitch attachment affixed to a three-point hitch of said vehicle.

20. The invention as in claim 19 wherein said quick hitch attachment includes laterally spaced engagement elements engageable by said frame mounting means, and means for controllably varying the position of said engagement elements relative to the points of mounting of said quick hitch attachment to said three-point hitch to provide said angular adjustability of said transversely disposed hitch.

* * * * *

UNITED STATES PATENT AND TRADEMARK OFFICE
CERTIFICATE OF CORRECTION

PATENT NO. : 5,094,300
DATED : March 10, 1992
INVENTOR(S) : Larry F. Jurgena It is certified that error appears in the above-identified patent and that said Letters Patent is hereby corrected as shown below:

Column 12, line 3, after the word "hitch" insert --means--.

Signed and Sealed this

First Day of June, 1993

Attest:

MICHAEL K. KIRK

*Attesting Officer*     Acting Commissioner of Patents and Trademarks